United States Patent [19]

Brice

[11] Patent Number: 5,725,071
[45] Date of Patent: Mar. 10, 1998

[54] MACHINE CUTTING TOOL SELECTIVE LUBRICATOR WITH AIR BLOW-OFF

[75] Inventor: Lawrence E. Brice, Sandusky, Mich.

[73] Assignee: Master Pneumatic-Detroit, Inc., Sterling Heights, Mich.

[21] Appl. No.: 789,827

[22] Filed: Jan. 28, 1997

[51] Int. Cl.⁶ .................................................. F01M 1/00
[52] U.S. Cl. ........................... 184/6.26; 184/7.4; 184/39.1
[58] Field of Search ............................ 184/6.26, 7.4, 184/39.1, 55.1

[56] References Cited

U.S. PATENT DOCUMENTS

| | | |
|---|---|---|
| 3,888,420 | 6/1975 | Boelkins . |
| 4,064,970 | 12/1977 | Reeves ................................. 184/6.26 |
| 4,324,316 | 4/1982 | Thrasher, Jr. et al. . |
| 4,754,848 | 7/1988 | Azzopardi et al. ................... 184/6.26 |
| 5,002,156 | 3/1991 | Gaunt ................................... 184/6.26 |
| 5,205,378 | 4/1993 | Boelkins ............................... 184/55.1 |
| 5,542,498 | 8/1996 | Boelkins ............................... 184/7.4 |

*Primary Examiner*—Thomas E. Denion
*Attorney, Agent, or Firm*—Barnes, Kisselle, Raisch, Choate, Whittemore & Hulbert

[57] ABSTRACT

A system to selectively lubricate and to continuously supply a forced air flow onto a machine cutting tool has a control valve to selectively communicate an air supply with a pulse generator which drives at least one liquid pump to control the discharge of liquid lubricant from the liquid pump into a continuous forced air flow from the air supply to discharge onto the cutting tool through a nozzle atomized lubricant and cooling air during machining and thereafter only forced air to evaporate and blow off the lubricant from the cutting tool and workpiece, to remove any residual material and chips of the machining operation from the cutting tool and to cool the cutting tool. To minimize the amount of liquid lubricant used by the system and the quantity of used lubricant which must be disposed of, the control valve allows air to flow from the air supply to the pulse generator only during machining when it is necessary to lubricate the cutting tool.

11 Claims, 4 Drawing Sheets

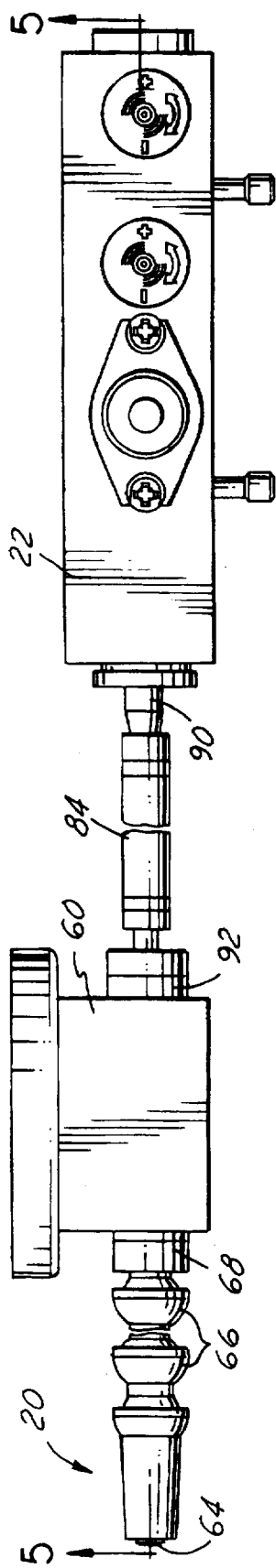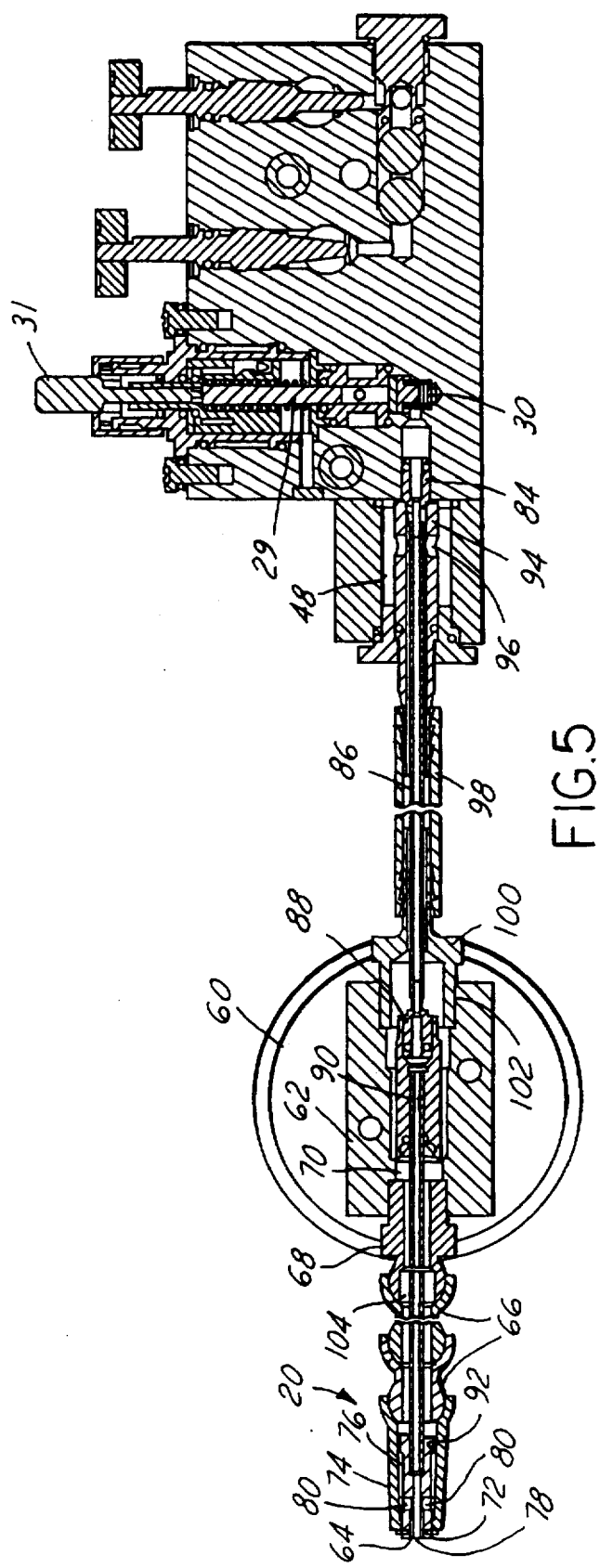

MACHINE CUTTING TOOL SELECTIVE LUBRICATOR WITH AIR BLOW-OFF

FIELD OF THE INVENTION

This invention relates generally to lubricators and more particularly to a system to supply a lubricant and forced air to a machine cutting tool.

BACKGROUND OF THE INVENTION

Liquid coolants and lubricants may be delivered to machine cutting tools by a pump such as the injection type pumps disclosed in U.S. Pat. Nos. 3,888,420 and 4,324,316, which intermittently deliver metered discrete quantities of the liquid lubricant into a pulse air stream to supply pulsed doses of atomized lubricant to the machine cutting tool in use. In certain machining operations such as cutting threads, the lubricant is supplied to the tap when it is rotating and cutting threads on the way into the workpiece and also when reversing the tap to remove it from the workpiece.

SUMMARY OF THE INVENTION

It has been discovered that it is not necessary to supply lubricant to the cutting tool while it is being removed from the workpiece if forced air is discharged onto the tool during removal from the workpiece. This greatly reduces the quantity of lubricant required and the quantity of used lubricant which must be removed from the tool, workpiece and machine and the quantity of used lubricant which must be processed and cleaned up for environmentally safe disposal. This also facilitates removal of cutting chips from the cutting tool and workpiece and disposal of cutting chips and residual materials from the machining operation.

A system to selectively lubricate and to continuously supply a forced air flow onto a machine cutting tool has a control valve to selectively communicate an air supply with a pulse generator which drives at least one liquid pump to control the discharge of liquid from the liquid pump into a continuous forced air flow from the air supply to discharge onto the machine cutting tool atomized lubricant and cooling air during machining and thereafter only forced air to both evaporate and blow off the liquid lubricant from the cutting tool and workpiece and to remove any residual material and chips of the machining operation from the cutting tool. To minimize the amount of liquid lubricant used by the system, the control valve allows air to flow from the air supply to the pulse generator only when it is necessary to lubricate the cutting tool.

Preferably, to efficiently supply the lubricant and air to the machine tool, the control valve is moveable to three positions. In a first position, the control valve permits air flow from the air supply to both the pulse generator and to the cutting tool to lubricate the tool. In a second position, the control valve prevents flow to the pulse generator but permits a continuous air flow to the cutting tool to cool and clean it. In a third position, the control valve prohibits flow to both the cutting tool and the pulse generator, such as when the machine tool is not actively in use machining workpieces.

The pump delivers a precise quantity of liquid lubricant to the cutting tool thereby reducing the amount of coolant used and also the amount of used lubricant that must be cleaned up and removed from the cutting tool, workpiece and machine tool. Preferably, the lubricant is delivered into the flow of air to the cutting tool such that the liquid is atomized or sprayed onto the tool. The subsequent forced air delivery to the cutting tool and workpiece tends to evaporate the liquid lubricant (particularly the water vehicle of a typical lubricant) to further reduce the amount of liquid that must be cleaned up or removed from the tool, workpiece and machine. The continuous air flow also helps to cool the cutting tool and to remove residual material of the machining process, such as metal chips, away from the cutting tool and workpiece.

Objects, features and advantages of this invention include providing a system to selectively supply lubricant to a machine cutting tool and to continuously supply air to the tool that minimizes the amount of liquid lubricant used, effectively lubricates and cools the cutting tool, atomizes and sprays the liquid onto the cutting tool within a continuous supply of air, supplies liquid lubricant to the tool only during the machining of a workpiece, continuously supplies air to the tool to cool it and clear chips from the tool and workpiece thereby increasing the service life of the tool, tends to evaporate and blow away lubricant from the tool thereby reducing the amount of used lubricant to be cleaned up and removed from the tool, workpiece and machine, can be used with several pumps to control the lubricant and air flow to several machine tools, is of relatively simple design and economical manufacture, is reliable, cost effective and efficient, safe and has a long in-service useful life.

BRIEF DESCRIPTION OF THE DRAWINGS

These and other objects, features and advantages of this invention will be apparent from the following detailed description of the preferred embodiment and best mode, appended claims and accompanying drawings in which:

FIG. 4 is a top view of a single lubricator pump and nozzle assembly;

FIG. 5 is a sectional view taken along line 5—5 of FIG. 4;

DETAILED DESCRIPTION OF THE PREFERRED EMBODIMENTS

Figure 1:
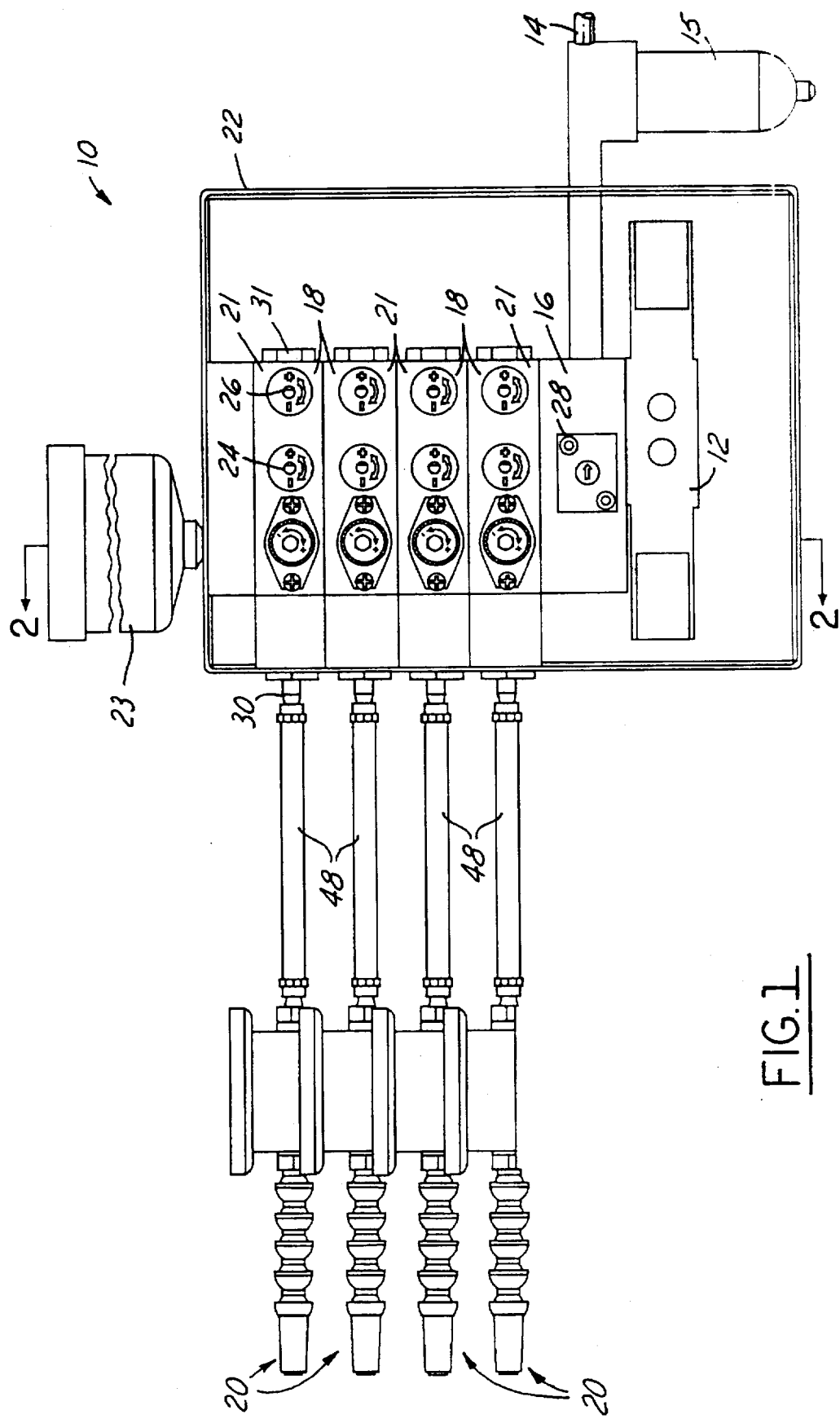
FIG. 1 is a side view of a system to supply a lubricant and air flow to several machine cutting tools and embodying this invention.
Figure 2:
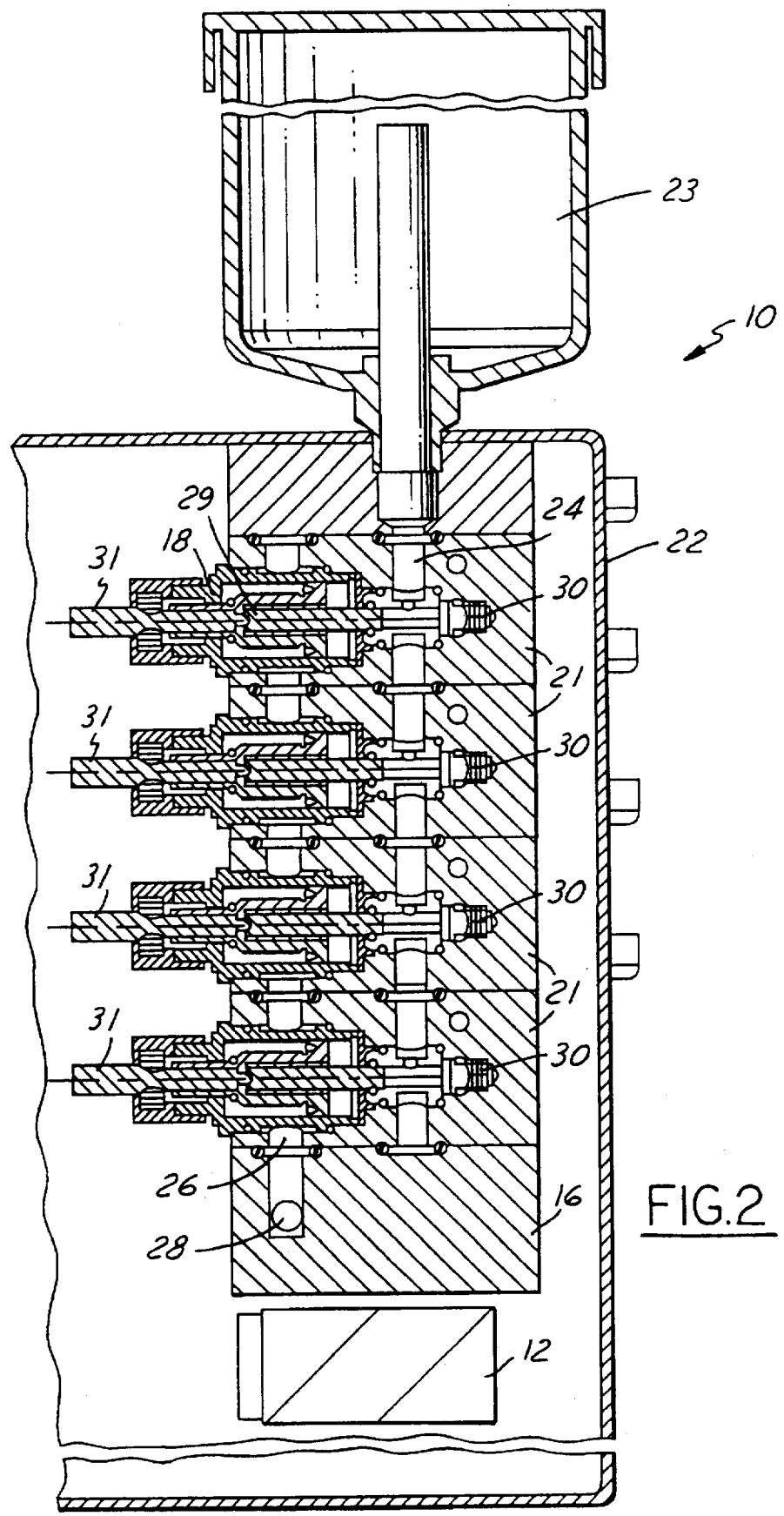
FIG. 2 is a sectional view taken along line 2—2 of FIG. 1.

Referring in more detail to the drawings, FIGS. 1 and 2 show a system 10 embodying this invention constructed to selectively lubricate and to continuously supply a forced air flow onto a machine cutting tool (not shown). The system has a control valve 12 to selectively communicate an air supply 14 through a filter and water trap 15 with a pulse generator 16 which drives each of a plurality of pumps 18 to control the discharge of liquid lubricant from each pump 18 while delivering a continuous forced air flow through each of a plurality of nozzle assemblies 20 onto an adjacent machine cutting tool. Preferably four modules 21 each with a pump 18 are mounted within a housing 22 to supply liquid to four nozzles and cutting tools.

A liquid reservoir 23 communicates with a liquid inlet 24 of each pump 18 to maintain a substantially constant supply of liquid lubricant to all of the pumps 18. Each pump 18 also has an air inlet 26 in communication with an air outlet 28 of the pulse generator 16 to receive pulses of air which advance a piston and plunger 29 of the pump 18 to dispense a minute and precisely metered quantity of liquid lubricant through a check valve and outlet 30 to a nozzle 20. Within limits, the quantity of liquid lubricant dispensed by each cycle of the piston and plunger 29 can be varied, adjusted and controlled by an adjustable stop 31 which varies and limits the extent of the stroke of the piston and plunger 29. The pumps 18 are preferably of the type disclosed in U.S. Pat. Nos. 3,731,763; 3,926,279 and 4,325,316, the disclosures of which are incorporated herein by reference, and hence their operation and structure will not be described in greater detail.

Figure 3:
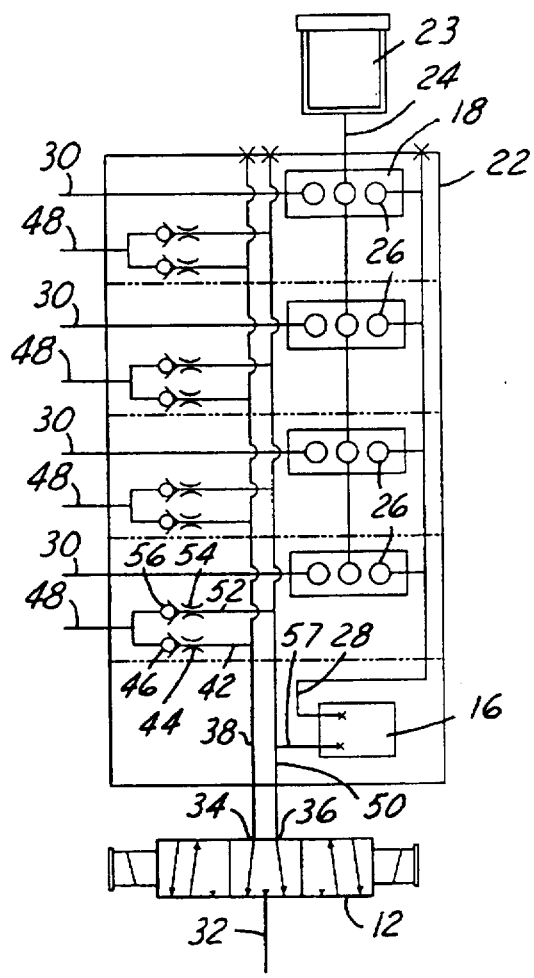
FIG. 3 is a schematic diagram of a preferred embodiment of the invention.

As shown in FIG. 3 control valve 12 is a three way valve with an air inlet port 32 connected to the air supply 14 and is selectively communicatable in a first position with a first outlet port 34 for only supplying compressed air to each nozzle 20, and a second position with a second outlet port 36 for both supplying compressed air to each nozzle 20 and to the pulse generator 16 to actuate the pumps 18 to simultaneously supply liquid lubricant to each nozzle 20. In a third valve position the inlet port 32 does not communicate with either of the first and second outlet ports and no compressed air is supplied to them.

The first outlet port 34 is connected to each nozzle 20 through a conduit 38, a branch line 42 with an adjustable flow rate control valve 44, a one way check valve 46 and a conduit 48. The second outlet 36 is also connected to each nozzle 20 through a conduit 50, a branch line 52 with an adjustable flow rate control valve 54, a one way check valve 56 and the conduit 48. Each check valve 46 and 56 prevents reverse flow through its associated branch line to thereby assure air flow to its associated nozzle 20 through its associated conduit 48. The second port 36 is also connected through a branch line 57 to the inlet of the pulse generator 16 the outlet of which is connected by the passage 28 to the inlet 26 of each pump 18.

As shown in FIGS. 4 and 5 each nozzle assembly 20 has a base 60 with a permanent magnet 62 for releasably mounting the assembly on a machine adjacent a cutting tool. A spout 64 through which compressed air and atomized lubricant are discharged is connected by articulated ball and socket linkages 66 to a connector 68 threaded into a bore 70 in the base 60. The spout 64 has a tubular spray head 72 received in a housing 74 and defining between them a dead end annular space 76 through which compressed air flows. The head 72 has a through bore 78 and transverse ports 80 through which compressed air is discharged from the spout 64.

Discrete quantities of liquid lubricant are intermittently supplied to the upstream end of the bore 78 in the head 72, atomized in the air flowing through the bore 78, and discharged from the head 72 in a spray or mist. Liquid lubricant from the outlet 30 of one of the pumps 18 is supplied to the head 72 through a coupling 84 connected to one end of a flexible tube 86, the other end of which is connected through a rotary coupling 88 to one end of a flexible tube 90, the other end of which is press fit into a counterbore 92 in the head 72 which communicates with the upstream end of the bore 78 therein.

Compressed air is supplied to the head 72 from an associated outlet passage 48 through a connector 94 with a transfer port 96 which is connected to one end of a flexible hose 98, the other end of which is connected to a coupling 100 received in a counterbore 102 in the base 60 and communicating with the passage in the bore 70, the passage 104 through the coupler 68 and links 66 which communicates with the annular passage 76 and the port 80 to supply the compressed air to the bore 78 in the head 72 from which the air is discharged through the downstream end of the bore. To shield and protect the liquid lubricant feed tubes, they are received within the various fitting passages and outer tubes which supply compressed air to the head of a nozzle.

In use, liquid lubricant is continuously supplied to the pumps 18 from the reservoir 23 so that the pumps when operating can deliver metered pulses or discrete quantities of liquid to each nozzle 20 adjacent a machine cutting tool. A continuous supply of compressed air typically at a pressure of 80-90 psi is delivered to the control valve 12 which selectively delivers that air to the conduit 38 and the conduit 50. When air is delivered to the conduit 38 it flows through each branch line 42 and their respective flow rate control valves 44 and check valves 46, into their respective conduits 48 and eventually through the nozzles 20 to be discharged onto the machine cutting tool where the air acts to evaporate and otherwise remove the lubricant from the cutting tool, to remove any residual materials, such as metal chips, from the machine tool, cutting tool and the workpiece and to cool the cutting tool. When the control valve 12 permits air to flow through the conduit 50, the air flows to the inlet of the pulse generator 16 and also to each of the branch lines 52 and through their respective flow rate control valves 54 and check valves 56 to their respective conduits 48 and through the nozzle 20 to be delivered onto the cutting tool.

The air supplied to the pulse generator 16 is delivered from the pulse generator 16 in intermittent pulses to the air inlet 26 of each of the pumps 18 to actuate the pump to deliver a discrete quantity of liquid lubricant. In some applications, valves can be disposed downstream of the pulse generator with a valve adjacent each pump to selectively communicate the pulse generator with each pump and permit each pump to be driven separately by the pulse generator. Preferably, the valves permit air flow therethrough when open and when closed, are vented to the atmosphere.

The control valve 12 is cycled to prevent air flow to the pulse generator 16 and hence, air flow to the pumps 18, to prevent the pumps 18 from delivering lubricant to the cutting tools when it is not necessary in the machining process. This reduces the amount of lubricant used in the machining operation which reduces the amount of used lubricant which must be cleaned-up after the machining operation is complete, reduces the cost to operate the machine and permits the coolant to be evaporated and blown-off of the tool, workpiece and machine by the air supplied to the cutting tool.

Figure 7:
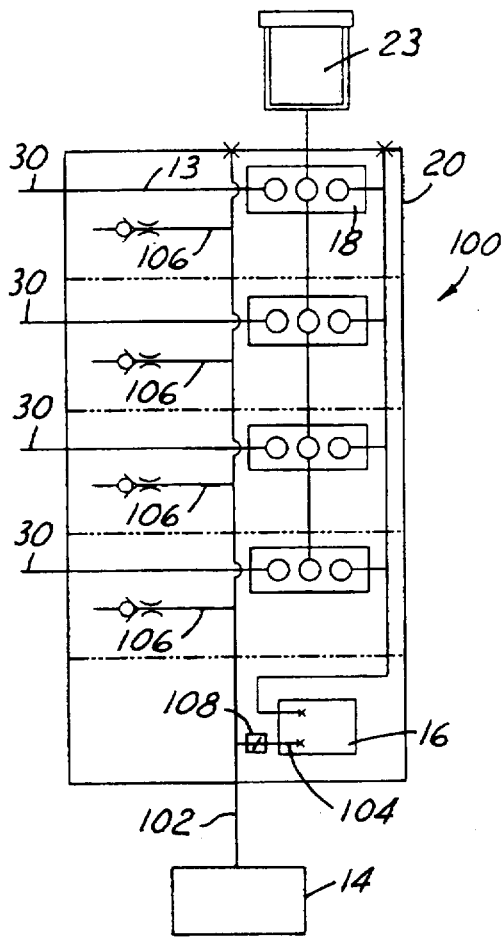
FIG. 7 is a schematic view of an alternate embodiment of this invention.
Figure 6:
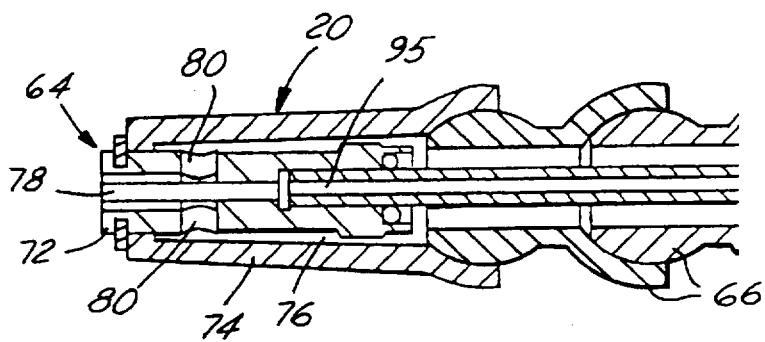
FIG. 6 is an enlarged sectional view of the nozzle as shown in FIG. 5.

In an alternate embodiment 100, as shown in FIG. 7, the air supply 14 has an outlet passage 102 in communication with the inlet 104 of the pulse generator 16 and also with a plurality of branch passages 106 each of which delivers a compressed air flow through a nozzle assembly 20 onto a cutting tool. A control valve 108 is connected between the inlet 104 of the pulse generator 16 and the outlet passage 102 of the air supply 14. The control valve 108 is operable to selectively permit air to flow from the outlet passage 102 to the pulse generator 16 to thereby actuate and control when the pumps 18 deliver the lubricant to each nozzle and hence a cutting tool. Thus, in this embodiment, the control valve 108 is either open to allow air flow to the pulse generator 16 or closed to prohibit air flow to the pulse generator 16. The delivery of air and liquid to the cutting tool through the nozzle assembly 20 is the same as in the preferred embodiment and will not be described again.

I claim:

1. A system to supply lubricant to at least one machine cutting tool comprising:
    a pulse generator having an inlet constructed for communication with a compressed air supply and an outlet to deliver pulses of compressed air;
    at least one liquid pump having a first inlet constructed for communication with a supply of liquid lubricant, a second inlet in communication with the outlet of the pulse generator and an outlet to deliver a metered quantity of liquid lubricant;
    at least one nozzle in communication with the compressed air supply and with the outlet of the liquid pump and having an outlet constructed to discharge a continuous air stream onto the cutting tool and to discharge atomized lubricant onto the cutting tool;
    a control valve having a first position communicating the air supply with the nozzle and with the pulse generator so that the liquid pump is driven by pulses of air from the pulse generator to supply liquid lubricant to the nozzle while the cutting tool is machining a workpiece and a second position which communicates the air supply with the nozzle and prohibits air flow from the air supply to the pulse generator to stop the pump from supplying liquid lubricant to the machine tool when it is not machining the workpiece and to apply only the continuous air stream to the cutting tool when it is not machining the workpiece.

2. The system of claim 1 wherein a plurality of liquid pumps are each driven by said one pulse generator.

3. The system of claim 1 wherein the control valve is moveable to a third position to prohibit communication of the compressed air supply with both the nozzle and the pulse generator.

4. The system of claim 1 wherein a first air passage communicates the compressed air supply with each of the nozzles and a second air passage communicates the compressed air supply with each of the nozzles and the pulse generator.

5. The system of claim 1 which comprises a plurality of nozzles and one of said liquid pump for each nozzle.

6. The system of claim 1 wherein an air supply passage communicates the compressed air supply with each nozzle and with the pulse generator.

7. The system of claim 6 which also comprises a second passage through which the air supply passage is communicated with the inlet of the pulse generator and the control valve is disposed in the second passage and is moveable to a closed position to prohibit air flow from the compressed air supply to the pulse generator.

8. The system of claim 1 wherein a first air supply passage communicates the compressed air supply with each nozzle and a second air supply passage communicates the compressed air supply with the inlet of the pulse generator and with each nozzle and the control valve selectively communicates the compressed air supply with one or both of the first air supply passage and the second air supply passage.

9. The system of claim 1 wherein the compressed air and the liquid lubricant flow into the nozzle through separate passages and the nozzle combines the liquid lubricant and the compressed air when the liquid lubricant is supplied to the nozzle to deliver the lubricant from the nozzle within the compressed air flow and thereby substantially atomize the liquid lubricant.

10. The system of claim 1 wherein the nozzle comprises a body having a passage with a discharge outlet, at least one port opening into the passage upstream of the outlet and communicating with the compressed air supply and an inlet upstream of the discharge outlet communicating with the outlet of the liquid pump for supplying liquid lubricant to the passage for atomization by the compressed air and discharge of atomized lubricant from the nozzle.

11. The system of claim 1 which comprises more than one of said liquid pumps for each nozzle.

* * * * *